United States Patent
Lagana

(10) Patent No.: US 8,494,896 B1
(45) Date of Patent: Jul. 23, 2013

(54) SYSTEM AND METHOD FOR RESTAURANT MENU ANALYSIS

(76) Inventor: Anthony L. Lagana, Windermere, FL (US)

( * ) Notice: Subject to any disclaimer, the term of this patent is extended or adjusted under 35 U.S.C. 154(b) by 41 days.

(21) Appl. No.: 13/183,344

(22) Filed: Jul. 14, 2011

Related U.S. Application Data

(60) Provisional application No. 61/364,303, filed on Jul. 14, 2010.

(51) Int. Cl.
*G06Q 10/00* (2006.01)

(52) U.S. Cl.
USPC .......................................................... 705/7.29

(58) Field of Classification Search
USPC ............................................... 705/7.11, 7.29
See application file for complete search history.

(56) References Cited

U.S. PATENT DOCUMENTS

| | | | |
|---|---|---|---|
| 6,876,973 B1 * | 4/2005 | Visconti | 705/5 |
| 7,680,690 B1 * | 3/2010 | Catalano | 705/15 |
| 7,958,873 B2 * | 6/2011 | Ernst et al. | 123/568.12 |
| 2004/0069313 A1 * | 4/2004 | DeLaquil | 128/921 |

* cited by examiner

*Primary Examiner* — Romain Jeanty
(74) *Attorney, Agent, or Firm* — Allen, Dyer, Doppelt, Milbrath & Gilchrist, P.A.

(57) ABSTRACT

A computer-based system for restaurant menu analysis comprises at least one processor and machine-readable memory configured to execute a menu data entry module, a menu database, a menu analysis module and a menu element reporting module. A computer-based method for restaurant menu analysis comprises using the at least one processor and machine-readable memory to receive menu data from a plurality of menus in a menu data entry module, the menu data including, for each menu, at least: a restaurant name, a restaurant cuisine type, a menu influence indicator and a plurality of menu elements. The received menu data is stored in a menu database. Occurrences for each one of at least a portion of the entered menu elements are calculated, as well as total occurrences. A scored list of influential menu elements is determined based thereon, and displayed to the user.

15 Claims, 3 Drawing Sheets

SYSTEM AND METHOD FOR RESTAURANT MENU ANALYSIS

CROSS-REFERENCE TO RELATED APPLICATION

This application claims the benefit of U.S. Provisional Application Ser. No. 61/364,303, filed on Jul. 14, 2010, the contents of which are herein incorporated by reference in their entirety.

FIELD OF THE INVENTION

The present invention relates to the analysis of menu content in the restaurant industry, and more particularly, to the analysis of menus in the fine dining segment.

BACKGROUND OF THE INVENTION

Many menu items which are currently staples of the various national restaurant chains were originally innovated in much smaller scale restaurants by influential chefs (generically referred to herein as "fine dining"). While many fine dining items may never make their way into the mainstream national chains, others do. It is advantageous for national restaurant chains to keep abreast of developments in fine dining, and accurately predict future trends, so that they can navigate the fine line between being uninteresting and out-of-date and becoming too extreme for mainstream tastes.

Current methods and system for menu analysis actually offer relatively little analysis. Instead, a raw quantification of menu items is typically generated from a large number of menus. Usually, the objective is to assemble as large an array of menus as possible. While this approach generates a limited amount useful data for national restaurant chains, further improvements are possible.

SUMMARY OF THE INVENTION

In view of the foregoing, it is an object of the present invention to provide an improved system and method for restaurant menu analysis. According to an embodiment of the present invention, a computer-based system for restaurant menu analysis comprises at least one processor and machine-readable memory configured to execute a menu data entry module, a menu database, a menu analysis module and a menu element reporting module.

The menu data entry module receives menu data from a plurality of menus, and prompts, for each menu entered by a user, input of: a restaurant name, a restaurant cuisine type, a menu influence indicator and a plurality of menu elements. The menu database stores the received menu data. The menu analysis module calculates occurrences the menu elements and determines a scored list of influential menu elements based thereon. The menu element reporting module displays results of the menu analysis module to the user.

According to aspects of the present invention, the determination of the scored list of influential menu elements is also determined based on the entered restaurant cuisine types and menu influence indicators.

According to a method aspect, a computer-based method for restaurant menu analysis comprises using at least one processor and machine readable memory to receive, via at least one input device, menu data from a plurality of menus in a menu data entry module, the menu data including, for each menu, at least: a restaurant name, a restaurant cuisine type, a menu influence indicator and a plurality of menu elements. The received menu data is stored in a menu database. Occurrences for each one of at least a portion of the entered menu elements are calculated, as well as total occurrences of all the at least a portion of the entered menu elements. A scored list of influential menu elements is determined based thereon, and displayed to the user.

These and other objects, aspects and advantages of the present invention will be better appreciated in view of the following detailed description of a preferred embodiment and accompanying drawings.

DETAILED DESCRIPTION OF A PREFERRED EMBODIMENT

Figure 1:
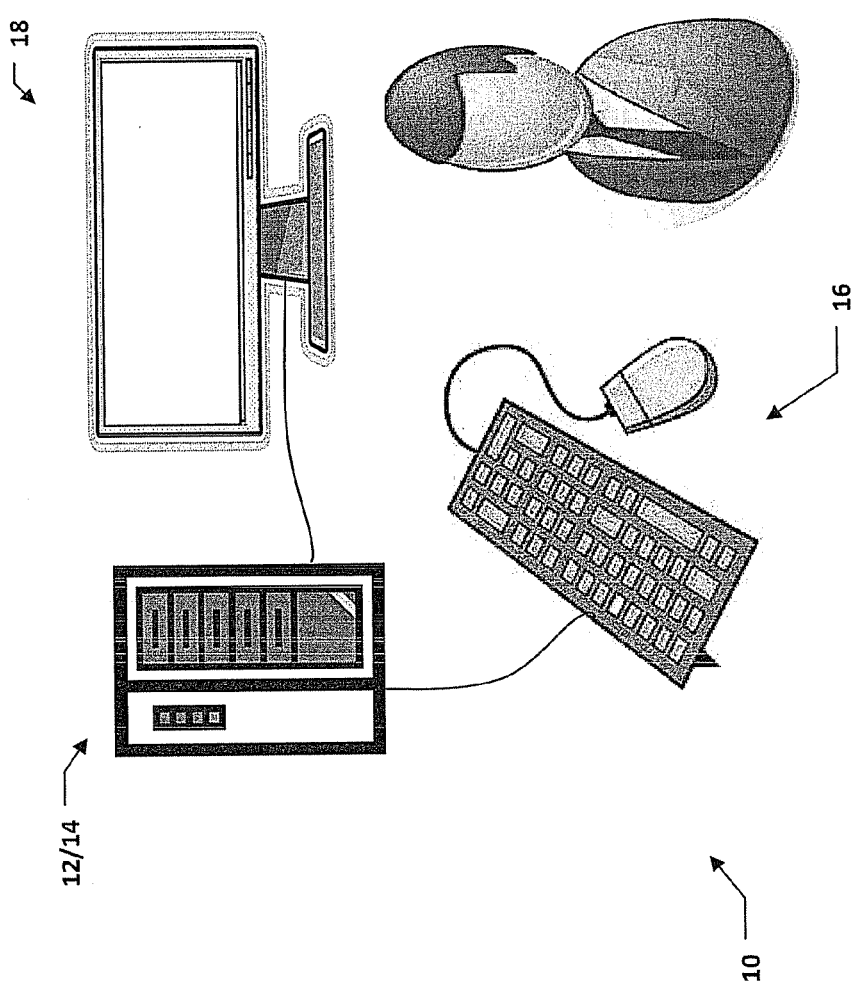
FIG. 1 is a schematic overview of a computer-based system for restaurant menu analysis, including a processor and machine-readable memory, according to an embodiment of the present invention.

Referring to FIG. 1, according to an embodiment of the present invention, a computer-based menu analysis system 10 includes at least one processor 12 and machine readable memory 14 in signal communication with one or more input device(s) 16 and display device(s) 18.

Non-limiting examples of computer-based systems include personal computers, network servers, cellular phones and other personal electronic devices. The present invention is not necessarily limited to particular processor types, numbers or designs, to particular code formats or languages, or to particular hardware or software memory media. The systems and methods and methods herein are necessarily hardware-based and can be realized in connection with a stand-alone software application, as well as a "plug-in" application configured to work in connection with another application, such as a word processing program.

The at least one input device 16 allows the processor 12 to receive inputs from a user, and is not necessarily limited to any particular type of input device. Non-limiting examples of input devices include touch screens, keyboards/pads, mice, trackballs and/or touch pads. The at least one display device 18 allows the processor 12 to communicate system outputs to a user. A "display device," as used herein, is not necessarily limited to a visual display, such a screen or monitor, but can also include audible, tactile or otherwise sensible communication of information to a user. Advantageously, the display and/or input devices 18, 20 can include accessibility assistance devices adapted for users faced with particular physical or cognitive challenges.

Figure 2:
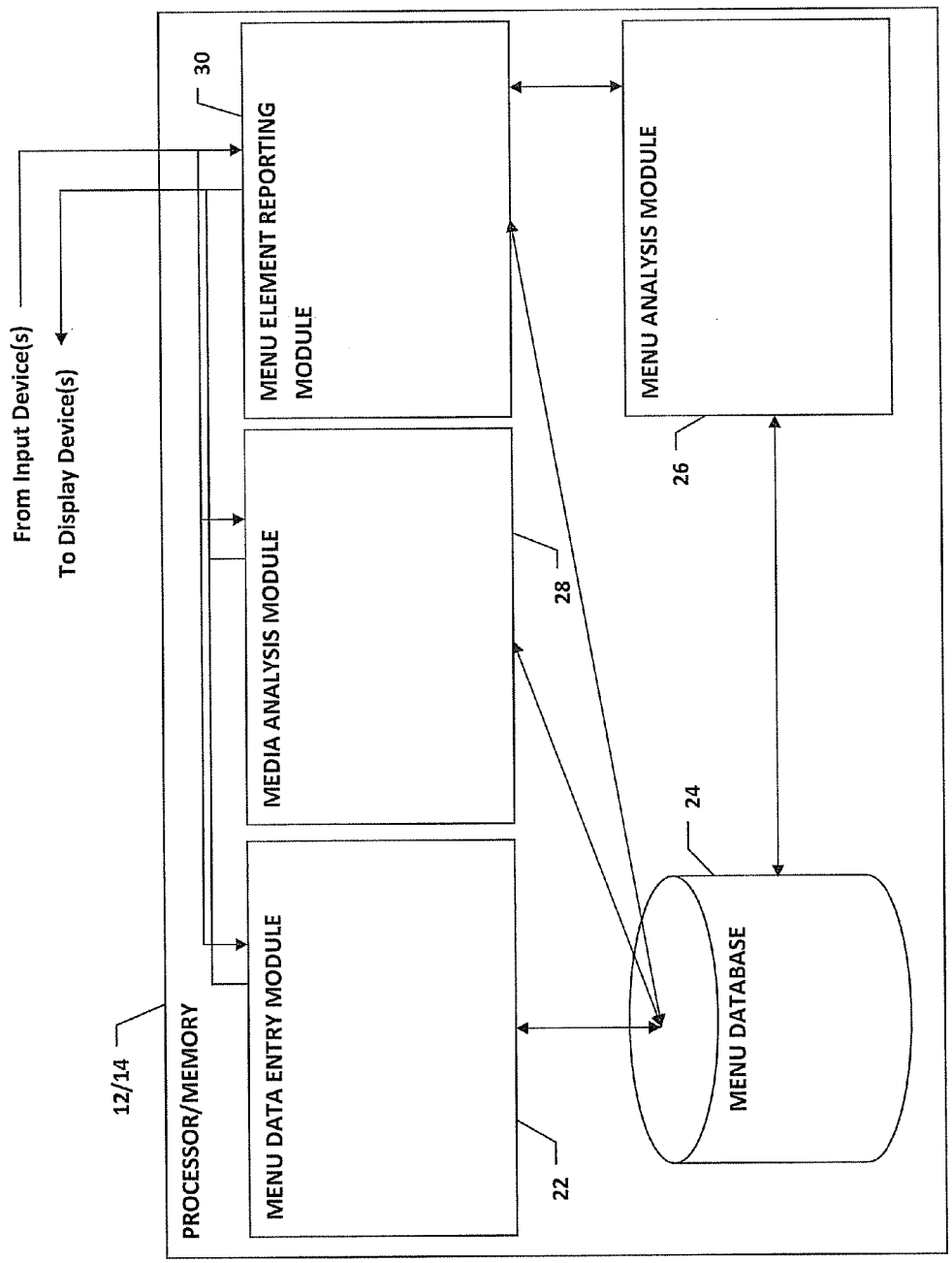
FIG. 2 is a schematic overview of modules executed by the processor and machine-readable memory of FIG. 1.

Referring to FIG. 2, the processor 12 and machine-readable memory 14 are configured to execute a menu data entry module 22 for receiving menu data from a plurality of menus, a menu database 24 for storing the received menu data, a menu analysis module 26 for analyzing the received menu data and determining a scored list of influential menu elements based thereon, a media analysis module 28 for receiving and analyzing article information from industry magazines, and a menu element reporting module 30 for displaying results of the menu analysis module to the user.

The menu data entry module 22 generates a menu input user interface prompting a user, for each menu entered, to input a restaurant name, a restaurant cuisine type, a menu influence indicator and a plurality of menu elements. After review and confirmation by the user, the received menu data is stored in the menu database.

The restaurant name entry is prompted by a corresponding-labeled data field in the user interface, and address and other contact information for the restaurant can also be collected.

The menu influence indicator is indicative of whether a fine dining establishment has sufficient prominence to exert a significant and lasting influence on menu trends. Using the menu influence indicator helps avoid skewing of menu analysis statistics by inclusion of menus from establishments that are unlikely to exert influence over the next few years, for instance, due to a lack of prominence or established history.

Entry of the menu influence indicator can be prompted by a correspondingly-labeled data field in the user interface in which a menu influence indicator is entered after separate determination by a user. Preferably, the user is prompted to identify which of a plurality of influence criteria apply to the entered menu. Each influence criteria has a pre-determined point value and, based on the user selections, the menu influence indicator is automatically calculated using the point values. Influence criteria preferably include inclusion in major restaurant guides, guide ratings, mentions in major fine dining periodicals and receipt of major awards, and prominence of chef.

In one example, 50 points are assigned to a restaurant based on inclusion in at least one major restaurant guides, such as *Relaix & Chateaux, Mobil, AAA, DiRoNA* and *Zagat*. If the restaurant is in more than one guide, an additional 25 points are assigned. If the restaurant receives a top rating in a guide, such a *Mobil* 5 star rating, or an *AAA* 5 diamond rating, a further 25 points are assigned. If the restaurant is mentioned in two or more fine dining periodicals, such as *Food & Wine, Gourmet, Bon Appétit* and *Nation's Restaurant News*, 25 points are assigned. Receipt of a major award, such as James Beard, *Food and Wine* "Best Of," *Nation's Restaurant News* "Fine Dining Hall of Fame" and *Gourmet* "50 Best Restaurants," adds 25 points. If the restaurant is owned/operated by a famous chef, such as a published cookbook author or a television personality, 25 points can be assigned.

The restaurant cuisine type entry is prompted by a corresponding-labeled data field in the user interface. Preferably, the data field provides a drop-down menu of cuisine type selections, from which the user makes a single selection. The restaurant cuisine type selections preferably include the following ten types: Italian, French, Mediterranean, Latin, Seafood, Asian, New American, Eclectic, Southern and Steakhouse.

The vast majority of fine dining establishments will self-identify their cuisine-type, which can be classified within one of the offered selections. If the restaurant self identifies its cuisine-type, this is preferably used as the basis for the cuisine type selection. If the restaurant does not self-identify its cuisine type, the user can make the selection based on a manual analysis of the menu elements, or alternately, the menu data entry module 22 can be further configured to determine the restaurant cuisine type based on an analysis of the menu elements.

For example, Latin is an appropriate classification for restaurants with menu elements occurring most predominantly to Spanish, Neuvo Latino, Southwestern, Regional Mexican, Central and South American, and Caribbean food. Seafood is appropriate where the menu is at least 70% seafood. Mediterranean is appropriate where the menu elements are predominantly from the region around the Mediterranean, including, but not limiting to, southern French, southern Italy, Greece, Turkey, North Africa and other countries of the Middle East. Southern is appropriate when the menu elements are predominantly from regions of North Carolina, South Carolina, Georgia, Louisiana or restaurants defined as low country, Mississippi, Alabama, Northern Florida and Cajun Creole. Asian is appropriate for menus with menu elements occurring predominantly in cuisines of Chinese, Japanese, Korean, Countries of Southeast Asia, India and Pacific Rim. New American is appropriate for menus with menu elements focusing on local/American grown, raised and harvested ingredients. Menus list origins of products should be from regions other than locations that are covered by the Southern definition. Items are recognized by general population to be an American dish; for example, but not limited to, burgers and crab cakes. Eclectic is appropriate where menu elements represent a fusion of multiple cuisines. Menu items may have at least two other cuisines in the descriptors with a minimum of four distinctive ingredients.

Entry of menu elements can be prompted simply by providing a data field for entry of items from the menu, but preferably prompts entry of menu elements by prompting the user to identify a category for each menu listing, depending on the category selected, prompts the user to identify specific listing characteristics.

Advantageously, the categories can include: Appetizers, Entrees, Soups, Sides, Salads, Pastas/Noodles, Pizza/Flatbreads, Sandwich/Burgers, Sushi, Ceviche, Cheese (as its own menu section) and Desserts.

Listing characteristics can include: Primary or main component (this defines what is being sold); Proteins and Protein Preparation; Ingredients and Ingredient Preparation; Sauces; Herb and Spices; Cheese (listed in its own menu section); and Dessert Accompaniments.

Primary or main components are the central component of a listing and define what is essentially being offered. Exemplary selections include: Shellfish (lobster, crab, oysters, etc.); Finfish (sea bass, tuna, mahi mahi, etc.); Seafood—other (squid, octopus, calamari, etc.); Meat (beef, lamb pork); Meat Other (venison, buffalo, rabbit, etc.); Poultry (chicken, duck guinea hen, cornish hens, eggs, foie gras); Combination (surf & turf, vegetable & meat, etc.); Vegetable; Fruit; Cheese; Pasta/Noodles; Risotto/Rice; Sandwich; and Pizza/Flatbread. For soups, selections can also include Bisque, Broth, Chilled, and Chowder. For desserts, selections can also include: Custard, Ice Cream-Sorbet, Candy, Pastry, Cookies, Cakes, Pie-Tart; Dessert—Other (Soufflé, Bananas Foster, etc.). For salads, selections can also include: Greens and Caesar. For sides, selections can also include: Starch—Potato, Starch—Polenta, Starch—Grits, Starch—Rice and Starch—Couscous.

The protein, if applicable, is the main protein source for the menu items. For example, in a Caesar salad, the main component might be romaine lettuce and the protein might be chicken. Additional ingredients are further ingredients called out in the description but which are neither the main component nor the protein. Herbs/spices include herbs and/or spices called out in the menu description.

The sauce, if applicable, is the general type of sauce used for the menu item, and additional sauce ingredients are additional sauce ingredients unique to that menu item. For example, a menu item featuring hollandaise sauce including blood orange juice would be categorized as a hollandaise sauce with blood orange juice listed as an additional ingredient. Sauce herbs/spices would includes herbs and spices called out as included in the sauce.

The protein preparation describes how the protein in the menu items is prepared; for instance, grilling, broiling, baking, frying, raw and the like. Similarly, the additional ingredient preparation describes what preparation is performed on the additional ingredients.

Prompting entry based on predetermined breakdowns of menu listing categories and characteristics helps ensure consistency of entered menu elements across different menus and facilitates subsequent analysis, and minimizes the weight or importance given to inconsequential parts of a menu listing. For instance, correctly determining total occurrences of menu elements across all menus is thereby facilitated.

The menu analysis module 26 analyzes the entered menu data to determine a scored list of influential menu elements that present a greater likelihood to successfully transition from fine dining to mainstream cuisine. In general, the menu analysis module 26 calculated total occurrences of each menu element, and total occurrences of all menu elements. Dividing the total occurrences of a given menu element by the total occurrences of all menu elements gives an occurrence ratio for that menu element. The menu elements can be listed scored based on their occurrence ratios.

However, the menu analysis module 26 can improve the accuracy of the scored list in a plurality of ways. Menus can be pre-screened for having their menu elements included in the calculations of total occurrences based on the menu influence indicators. For example, only menu elements from menus meeting a predetermined influence threshold are included. Based on the influence criteria described above, an exemplary threshold could be 100 points. Only menus having influence indicators totaling 100 or more points would have their menu elements used in the calculations of total occurrences.

Additionally, to avoid attributing undue influence to menu elements that have a relatively high number of occurrences but only within a small number of restaurant cuisine type, the scored list can only include menu elements that occur in at least a predetermined number of restaurant cuisine types. Based on the ten restaurant cuisine types described above, an exemplary predetermined number could be 7 of the 10.

Also, to avoid attributing undue influence to a particular cuisine type, only an equal number of qualifying menus from each restaurant cuisine type could be used. For example, the menu analysis module could calculate occurrences from only the top ten most influential menus within each restaurant cuisine type.

To avoid attributing undue weight to top menu elements occurring in periods of overall low menu influence, the menu analysis module can also determine an average influence indicator for all menus used in occurrence calculations. For example, in one year or quarter, or other period being analyzed, the menus used in calculating occurrences have an average influence indicator of 107, whereas in another year the menus have an average influence indicator of 118. The occurrence ratio can be multiplied by the average influence indicator to generate an influence-weighted occurrence ratio. Thus, for each menu element qualifying to appear in the scored list, the following formula is applied:

$$\text{Weighted occurrence ratio} = (\text{Occurrences of given menu element})/(\text{Total menu element occurrences}) \times (\text{Average Influence Indicator})$$

The media analysis module 28 is adapted to receive article information from industry magazines. Preferably, the user is prompted to identify an article topic as part of the article information. The article topics are quantified to determine what the most prevalent food-related topics are currently. The magazines and articles selected for review and inclusion preferably cover a wide range of food-related topics, and are not limited to fine dining. For instance, articles on fast food would be included, as well as non-restaurant specific articles on food health issues.

The menu element reporting module 30 generates a graphical user interface allowing the user to request and view results from the menu analysis module 26, such as the scored list of influential menu elements, as well as to search and view historical received menu data. Once all menu elements have been received by the menu data entry module 22, the information stored in the menu database 24 can be cross-indexed based on any of the menu item characteristics and other statistical analyses can be performed in addition to determination of the scored list of menu elements. For example, the prevalence of main components can be determined across all cuisines, within a given cuisine, for a given menu section (e.g., appetizers), and for a given meal (e.g., lunch). The menu element reporting module 30 also allows the user to display information from the media analysis module 28.

Preferably, the menu element reporting module 30 allows the user to specify a time period for which received menu data is to be used to display the scored list or other data for which analysis is requested. The menu element reporting module 30 can also allow the user to specify report formats and to save and export reports. Accordingly, scored lists of influential menu elements can be shared with, for instance, subscribers to the system 10.

Figure 3:
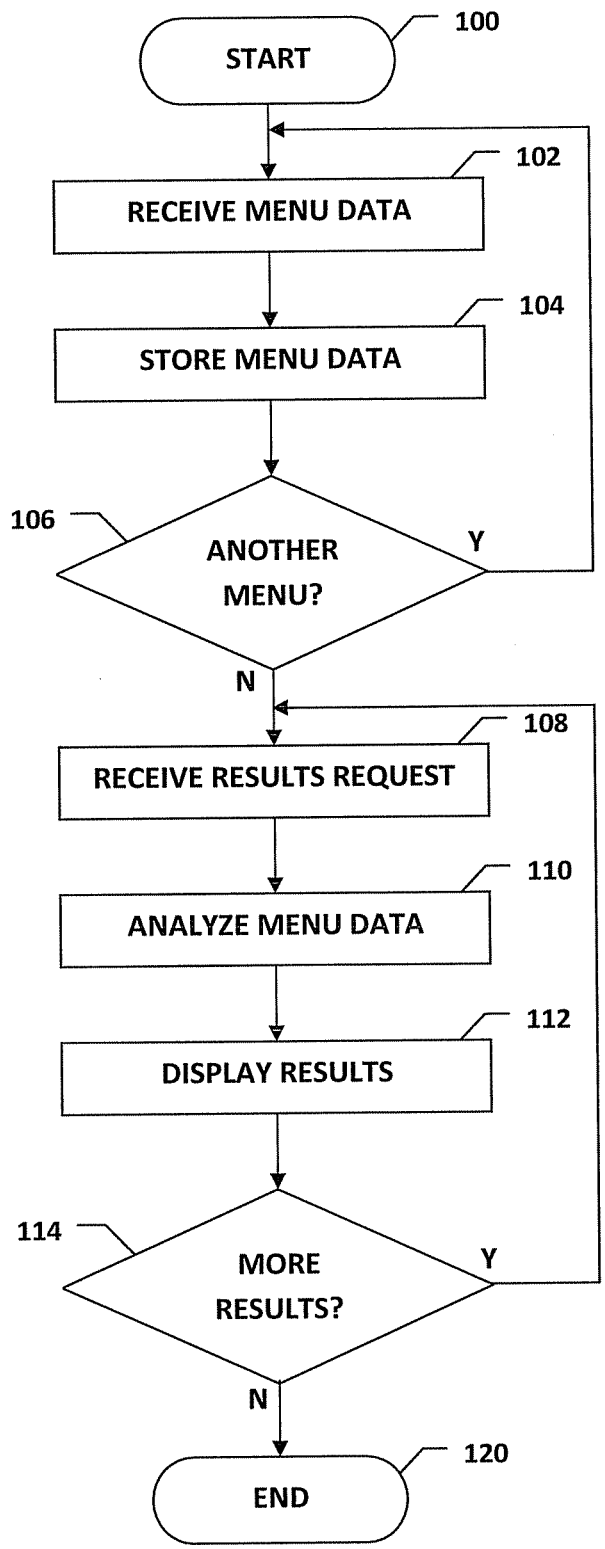
FIG. 3 is a flow diagram of a computer-based menu analysis method, according a method aspect of the present invention.

Referring to FIG. 3, according to a method aspect of the present invention, a computer-based method for menu analysis starts at block 100. At block 102, menu data is received. The menu data is received via an input device and includes a restaurant name, a restaurant cuisine type, a menu influence indicator and a plurality of menu elements.

The restaurant cuisine type can be received directly from a user or determined automatically based on analysis of received menu elements. Similarly, the menu influence indicator can be input directly by a user or determined based on selection of predetermined influence criteria with assigned point values. The menu elements are preferably entered by soliciting entry of predetermined listing categories and characteristics.

At block 104, the menu data is stored in a database for later viewing, analysis and/or editing. At block 106, if another menu is to be entered, the method returns to block 102. If no more menus are to be entered, the method proceeds to block 108.

At block 108, menu analysis results are requested via an input device. At block 110, the menu results are analyzed based on the request and predetermined analysis criteria. Alternately, if the results requested are for an analysis previously performed, those results can be recalled from memory.

The analysis can include determination of a scored list of influential elements. The determination of the scored list of influential elements preferably includes only menu elements from menus meeting a predetermined influence threshold and/or appearing in at least a predetermined number of restaurant cuisine types. The scoring of the menu elements in the list can be weighted based on the average influence indicator of entered menus whose menu elements were used in the analysis.

At block 112, the results of the analysis are displayed to the user using the display device. The results can also be printed, as well as electronically stored and transmitted. At block 114, if more results are desired, the method returns to block 108. If no more results are desired, the method ends at block 120. The method can be reiterated as necessary, with steps thereof performed in any logical order.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. A computer-based system for restaurant menu analysis comprising at least one processor and machine-readable memory configured to execute:
   a menu data entry module for receiving menu data from a plurality of menus, the menu data entry module prompting, for each menu entered by a user, input of at least: a restaurant name, a menu influence indicator and a plurality of menu elements;
   a menu database for storing the received menu data;
   a menu analysis module for calculating occurrences of the menu elements across all entered menus having menu influence indicators meeting a predetermined influence threshold, and determining a scored list of influential menu elements based thereon; and
   a menu element reporting module for displaying results of the menu analysis module to the user;
   wherein the menu analysis module also determines an average menu influence for all entered menus having the menu influence indicators meeting the predetermined influence threshold, and the determination of the scored list of influential menu elements is weighted based on the average menu influence.

2. The system of claim 1, wherein the menu data entry module prompts the user to input the menu influence indicator for each menu entered by prompting the user to identify which of plurality of influence criteria apply to the entered menu and automatically calculating the menu influence indicator based thereon.

3. The system of claim 2, wherein the plurality of influence criteria include at least one of: inclusion in major restaurant guides, guide ratings, mentions in major fine dining periodicals and receipt of major awards, and prominence of chef.

4. The system of claim 3, wherein the plurality of influence criteria include all of: inclusion in major restaurant guides, guide ratings, mentions in major fine dining periodicals and receipt of major awards, and prominence of chef.

5. The system of claim 1, wherein the menu data entry module also prompts input of a restaurant cuisine type for each menu entered by the user; and
   wherein the menu analysis module only includes menu elements in the scored list of influential menu elements that occur in at least a predetermined number of restaurant cuisine types.

6. The system of claim 5, wherein the menu data entry module prompts the user to enter the restaurant cuisine type for each menu entered by the user by prompting the user to select a single restaurant cuisine type from a list of predetermined cuisine types.

7. The system of claim 6, wherein the restaurant cuisine type include all of: French, Italian, Latin, Seafood, Steakhouse, Mediterranean, Southern, Eclectic, Asian and New American.

8. The system of claim 5, wherein the restaurant cuisine type include at least one of: French, Italian, Latin, Seafood, Steakhouse, Mediterranean, Southern, Eclectic, Asian and New American.

9. A computer-based system for restaurant menu analysis comprising at least one processor and machine-readable memory configured to execute:
   a menu data entry module for receiving menu data from a plurality of menus, the menu data entry module prompting, for each menu entered by a user, input of at least: a restaurant name, a restaurant cuisine type and a plurality of menu elements;
   a menu database for storing the received menu data;
   a menu analysis module for calculating occurrences of the menu elements, and determining a scored list of influential menu elements based thereon, the scored list of influential menu elements only including menu elements that occur in at least a predetermined number of restaurant cuisine types; and
   a menu element reporting module for displaying results of the menu analysis module to the user;
   wherein the menu data entry module only calculates occurrences of the menu elements across entered menus having menu influence indicators meeting a predetermined influence threshold;
   wherein the menu analysis module also determines an average menu influence for all entered menus having the menu influence indicators meeting the predetermined influence threshold, and the determination of the scored list of influential menu elements is weighted based on the average menu influence.

10. The system of claim 9, wherein the menu data entry module also prompts input of a menu influence indicator for each menu entered by the user; and
    wherein the menu analysis module also determines the scored list of influential menu elements based on the menu influence indicators.

11. The system of claim 9, wherein the restaurant cuisine type include at least one of: French, Italian, Latin, Seafood, Steakhouse, Mediterranean, Southern, Eclectic, Asian and New American.

12. The system of claim 9, wherein the restaurant cuisine type include all of: French, Italian, Latin, Seafood, Steakhouse, Mediterranean, Southern, Eclectic, Asian and New American.

13. A computer-based method for restaurant menu analysis, the method comprising using at least one processor and machine-readable memory to:
    receive, via at least one input device, menu data from a plurality of menus in a menu data entry module, the menu data including, for each menu, at least: a restaurant name, a restaurant cuisine type, a menu influence indicator and a plurality of menu elements;
    store the received menu data in a menu database;
    calculate occurrences for each one of at least a portion of the entered menu elements;
    calculate total occurrences of all the at least a portion of the entered menu elements;
    determine a scored list of influential menu elements based thereon, the influential menu elements each being scored based on a ratio of the occurrences of each one of the at least a portion of the entered menu elements to the total occurrences of all the at least a portion of the entered menu elements; and
    display, via at least one display device, results of the menu analysis module to the user;
    wherein the at least a portion of the entered menu elements for which occurrences are calculated are determined based on the influence indicators of their respective menu meeting a predetermined threshold;
    further comprising using the at least one processor and machine readable memory to determine an average menu influence for all entered menus having the menu influence indicators meeting the predetermined influence threshold;

wherein the scored list of influential menu elements is weighted based on the average menu influence.

14. The method of claim 13, further comprising using the at least one processor and machine readable memory to calculate the influence indicators based on selected influence criteria.

15. The method of claim 13, wherein the influential menu elements are included in the scored list only if occurring in at least a predetermined number of restaurant cuisine types.

* * * * *